(12) United States Patent
Nakamura (10) Patent No.: US 12,496,763 B2
(45) Date of Patent: Dec. 16, 2025

(54) BLOW MOLDING DEVICE AND MANUFACTURING METHOD OF RESIN LINER FOR PRESSURE VESSEL USING THE SAME

(71) Applicant: Yachiyo Industry Co., Ltd., Saitama (JP)

(72) Inventor: Kazuhiro Nakamura, Saitama (JP)

(73) Assignee: Yachiyo Industry Co., Ltd., Saitama (JP)

( * ) Notice: Subject to any disclaimer, the term of this patent is extended or adjusted under 35 U.S.C. 154(b) by 323 days.

(21) Appl. No.: 17/780,035

(22) PCT Filed: Sep. 29, 2020

(86) PCT No.: PCT/JP2020/036947
§ 371 (c)(1),
(2) Date: May 26, 2022

(87) PCT Pub. No.: WO2021/106358
PCT Pub. Date: Jun. 3, 2021

(65) Prior Publication Data
US 2022/0410462 A1 Dec. 29, 2022

(30) Foreign Application Priority Data
Nov. 27, 2019 (JP) .................................. 2019-214140

(51) Int. Cl.
*B29C 49/04* (2006.01)
*B29C 49/24* (2006.01)
(Continued)

(52) U.S. Cl.
CPC .............. *B29C 49/24* (2013.01); *B29C 49/04* (2013.01); *B29C 49/5613* (2022.05);
(Continued)

(58) Field of Classification Search
CPC ..... B29C 49/24; B29C 49/5613; B29C 49/04; B29C 2049/2404; B29C 49/58;
(Continued)

(56) References Cited

U.S. PATENT DOCUMENTS 3,209,401 A * 10/1965 Mehnert ................. B29C 49/76
65/261
3,767,747 A 10/1973 Uhlig
(Continued)

FOREIGN PATENT DOCUMENTS

JP    S 60149430 A    8/1985
JP    4599380         12/2010
(Continued)

OTHER PUBLICATIONS

JPS60149430A_Machine Translation (Year: 1985).*
(Continued)

*Primary Examiner* — Yunju Kim
(74) *Attorney, Agent, or Firm* — Dority & Manning, P.A.

(57) ABSTRACT

To suppress the degradation of sealing property of a pressure vessel and the deterioration of a sealing member, and to reduce the workload and cost of manufacture, a blow molding device includes a pair of molds configured to be clamped to sandwich a parison from both lateral sides, and a blow pin configured to form a neck portion together with the molds. The blow pin includes a blow pin body portion having an outer circumferential surface of a shape corresponding to an inner circumferential surface of the neck portion, and a ring portion forming an annular recess portion between the blow pin body portion and the ring portion to form an outer circumferential surface of a tip portion of the neck portion, which is a smooth surface without any parting line.

10 Claims, 11 Drawing Sheets

(51) Int. Cl.
  *B29C 49/56* (2006.01)
  *B29C 49/60* (2006.01)
  *B29L 31/00* (2006.01)
(52) U.S. Cl.
  CPC ...... *B29C 49/60* (2013.01); *B29C 2049/2404* (2013.01); *B29L 2031/7156* (2013.01)
(58) Field of Classification Search
  CPC ... B29C 2049/622; B29C 49/62; B29C 33/10; B29C 37/006; B29L 2031/7156
  See application file for complete search history.

(56) References Cited

U.S. PATENT DOCUMENTS

| | | | | |
|---|---|---|---|---|
| 4,123,218 | A | * | 10/1978 | Krall ..................... B29C 49/58 425/535 |
| 4,545,953 | A | * | 10/1985 | Cage ..................... B65D 23/06 425/527 |
| 2009/0071930 | A1 | | 3/2009 | Sato et al. |
| 2013/0032963 | A1 | * | 2/2013 | Tokiwa ................... C08L 23/10 264/51 |
| 2013/0164404 | A1 | * | 6/2013 | Maki ...................... B29C 49/18 425/535 |

FOREIGN PATENT DOCUMENTS

| | | |
|---|---|---|
| JP | 2014046676 | 3/2014 |
| JP | 2015030117 | 2/2015 |
| JP | 2017089768 | 5/2017 |
| WO | WO 2019/034705 A1 | 2/2019 |

OTHER PUBLICATIONS

Extended European Search Report for corresponding Application No. EP 20893486.9, dated Jan. 4, 2023, 10 pages.
International Search Report (w/ English Translation) for corresponding PCT Application No. PCT/JP2020/036947, mailed Dec. 8, 2020, 5 pages.

* cited by examiner

BLOW MOLDING DEVICE AND MANUFACTURING METHOD OF RESIN LINER FOR PRESSURE VESSEL USING THE SAME

CROSS REFERENCE TO RELATED APPLICATIONS

This application is the U.S. National Stage entry of International Application No. PCT/JP2020/036947 filed under the Patent Cooperation Treaty on Sep. 29, 2020, which claims priority to Japanese Patent Application No. 2019-214140 filed on Nov. 27, 2019, both of which are incorporated herein by reference.

TECHNICAL FIELD

The present disclosure relates to a blow molding device for manufacturing a resin liner for a pressure vessel and a manufacturing method of the resin liner for the pressure vessel using the blow molding device.

BACKGROUND ART

A known pressure vessel made of resin stores high-pressure gas or high-pressure liquid such as compressed hydrogen or liquefied petroleum gas (LPG). Such a pressure vessel includes a resin liner, a metal cap member, and a fiber reinforced resin layer (Patent Document 1). The resin liner includes a storage portion to store gas or liquid and a tubular protruding portion (neck portion) protruding outward from the storage portion. The cap member is provided around the neck portion and includes a disk-like contact portion that is in contact with an outer surface of the storage portion. The fiber reinforced resin layer covers outer surfaces of the storage portion of the resin liner and the contact portion of the cap member. In this pressure vessel, to prevent occurrence of a leak path, an O ring is interposed between the neck portion and a valve inserted into the neck portion (see FIG. 5 of Patent Document 1), between the neck portion and the cap member (see FIG. 3 of Patent Document 1), and the like.

Further, the applicant proposes a pressure vessel and a manufacturing method thereof in which a gas barrier layer is not exposed on a contact surface (a surface that is in contact with a sealing member) provided around a neck portion of a resin liner when the resin liner having multiple layers including the gas barrier layer is manufactured by using blow molding (Patent Document 2). In this pressure vessel, at least the gas barrier layer and its outer layer are removed from a portion of the neck portion of the resin liner that is in contact with the sealing member, and thus the gas barrier layer is not exposed in the above portion. Accordingly, the degradation of sealing property and the deterioration of the sealing member are prevented.

PRIOR ART DOCUMENT(S)

Patent Document(s)

Patent Document 1: Japanese Patent No. 4599380
Patent Document 2: JP2017-89768A

SUMMARY OF THE INVENTION

Task to be Accomplished by the Invention

In the pressure vessel shown in FIG. 5 of Patent Document 1 in which the O ring is interposed between the neck portion and the valve, the O ring is sandwiched, in the axial direction of the valve, between a fall-prevention wall protruding inward from an inner circumference of the neck portion of the resin liner and a large diameter portion of the valve. Accordingly, the self-sealing function (the function that the sealing property of the sealing member is enhanced as the resin liner receives high pressure inside the vessel) may not be fulfilled, and thus the sealing property may be degraded.

In the pressure vessel shown in FIG. 3 of Patent Document 1 in which the O ring is interposed between the neck portion and the cap member, the self-sealing function can be fulfilled since the O ring is arranged around the neck portion. However, a parting line, which is formed by a slight gap or step generated on a divisional surface of the molds, appears on an outer circumferential surface of the neck portion formed by using blow molding. Due to the parting line, the sealing property may be degraded and the sealing member may be deteriorated.

Further, in the pressure vessel described in Patent Document 2, an outer circumference of a portion of the neck portion that is in contact with the sealing member is removed, and thus the parting line does not appear on the above portion. However, to finish the removal surface smoothly, the workload and cost of processing become large.

In view of the above background, an object of the present invention is to provide a blow molding device for manufacturing a resin liner and a manufacturing method of the resin liner using the blow molding device that can suppress the degradation of sealing property of a pressure vessel and the deterioration of a sealing member, and reduce the workload and cost of manufacture.

Means for Accomplishing the Task

To achieve the above object, one aspect of the present invention provides a blow molding device (50) for manufacturing a resin liner (2) for a pressure vessel (1), the resin liner including a tubular neck portion (12) to which a cap member (3) is fitted externally, the blow molding device comprising: a pair of molds (52) configured to be clamped so as to sandwich, from both lateral sides, a parison (55) from which the resin liner is formed, the pair of molds defining a cavity (56) having a shape corresponding to a contour of a main body portion (11) of the resin liner; and a blow pin (53) configured to form the neck portion together with the molds and having an air supply opening (58) to be arranged inside the parison, wherein the blow pin includes: a blow pin body portion (61) provided with an air supply passage (59) that leads to the air supply opening and having an outer circumferential surface of a shape corresponding to an inner circumferential surface of the neck portion; and a ring portion (63) provided coaxially with the blow pin body portion and forming an annular recess portion (62) between the blow pin body portion and the ring portion so as to form an outer circumferential surface of a tip portion (34) of the neck portion, the annular recess portion being recessed away from the cavity.

According to this aspect, the tip portion of the neck portion of the resin liner is formed by the annular recess portion, and the shape of an inner circumferential surface of the ring portion is transferred to the outer circumferential surface of the tip portion of the neck portion. Accordingly, it is possible to form the outer circumferential surface of the tip portion of the neck portion into a smooth surface without a parting line. Accordingly, by attaching a sealing member between the neck portion and the cap member such that the sealing member is in contact with the outer circumferential surface of the tip portion of the neck portion, it is possible to prevent the degradation of sealing property and the deterioration of the sealing member. Further, by placing the sealing member outside the neck portion, it is possible to improve the sealing property by virtue of the self-sealing function.

Preferably, the blow pin is provided with an air release passage (64) extending from a bottom of the annular recess portion.

According to this aspect, the parison is more likely to spread over the bottom of the annular recess portion.

Preferably, the ring portion is provided fixedly to the blow pin body portion, and the blow pin is movable in an axial direction thereof with respect to the pair of molds.

According to this aspect, by moving the blow pin toward the cavity, it is possible to cause the parison to spread over the bottom of the annular recess portion even if it is impossible to cause the parison to reach the bottom of the annular recess portion only by clamping the molds. Accordingly, it is possible to increase the axial length of the tip portion of the neck portion on which the parting line does not appear.

Preferably, the ring portion is slidable in an axial direction thereof with respect to the blow pin body portion.

According to this aspect, by sliding the ring portion in the axial direction thereof toward the cavity with respect to the blow pin body portion, it is possible to cause the parison to spread over the bottom of the annular recess portion without moving the blow pin body portion in the axial direction thereof. Accordingly, it is possible to increase the axial length of the tip portion of the neck portion on which the parting line does not appear.

To achieve the above object, one aspect of the present invention provides a manufacturing method of the resin liner using the blow molding device, the manufacturing method comprising: a parison arranging process (FIG. 5A) of arranging the parison on an outer circumferential side of the blow pin and between the pair of molds that are laterally separated from each other; a mold clamping process (FIG. 5B) of clamping the pair of molds such that the pair of molds sandwich the parison; and a blow process (FIG. 5C) of expanding the parison by supplying air to an inside thereof from the air supply opening of the blow pin and transferring a shape of an inner surface of the cavity to a portion of the parison from which the main body portion of the resin liner is formed, wherein between the mold clamping process and the blow process, the parison enters the annular recess portion and a shape of an inner circumferential surface of the ring portion is transferred to a portion of the parison from which the tip portion of the neck portion is formed.

According to this aspect, it is possible to form the outer circumferential surface of the tip portion of the neck portion into a smooth surface without a parting line. Accordingly, by attaching a sealing member between the neck portion and the cap member, it is possible to improve the sealing property by virtue of the self-sealing function and prevent the deterioration of the sealing member.

Preferably, between the mold clamping process and the blow process, the annular recess portion moves toward the cavity along an axial direction of the blow pin.

According to this aspect, by moving the annular recess portion toward the cavity, it is possible to cause the parison to spread over the bottom of the annular recess portion even if it is impossible to cause the parison to reach the bottom of the annular recess portion by the mold clamping process.

Accordingly, it is possible to increase the axial length of the tip portion of the neck portion on which the parting line does not appear.

Preferably, the ring portion is provided fixedly to the blow pin body portion and the blow pin is movable in the axial direction, and between the mold clamping process and the blow process, the annular recess portion moves as the blow pin moves in the axial direction.

According to this aspect, by moving the blow pin toward the cavity, it is possible to move the annular recess portion in the axial direction thereof and cause the parison to spread over the bottom of the annular recess portion.

Preferably, the ring portion is slidable in an axial direction thereof with respect to the blow pin body portion, and between the mold clamping process and the blow process, the annular recess portion moves as the ring portion slides in the axial direction thereof with respect to the blow pin body portion.

According to this aspect, by sliding the ring portion toward the cavity with respect to the blow pin body portion, it is possible to move the annular recess portion in the axial direction thereof and to cause the parison to spread over the bottom of the annular recess portion without moving the blow pin body portion in the axial direction thereof.

Effect of the Invention

Thus, according to the above aspects, it is possible to provide a blow molding device for manufacturing a resin liner and a manufacturing method of the resin liner using the blow molding device that can suppress the degradation of sealing property of a pressure vessel and the deterioration of a sealing member, and reduce the workload and cost of manufacture.

DETAILED DESCRIPTION OF THE INVENTION

In the following, an embodiment of the present invention will be described in detail with reference to the drawings.

Figure 1:
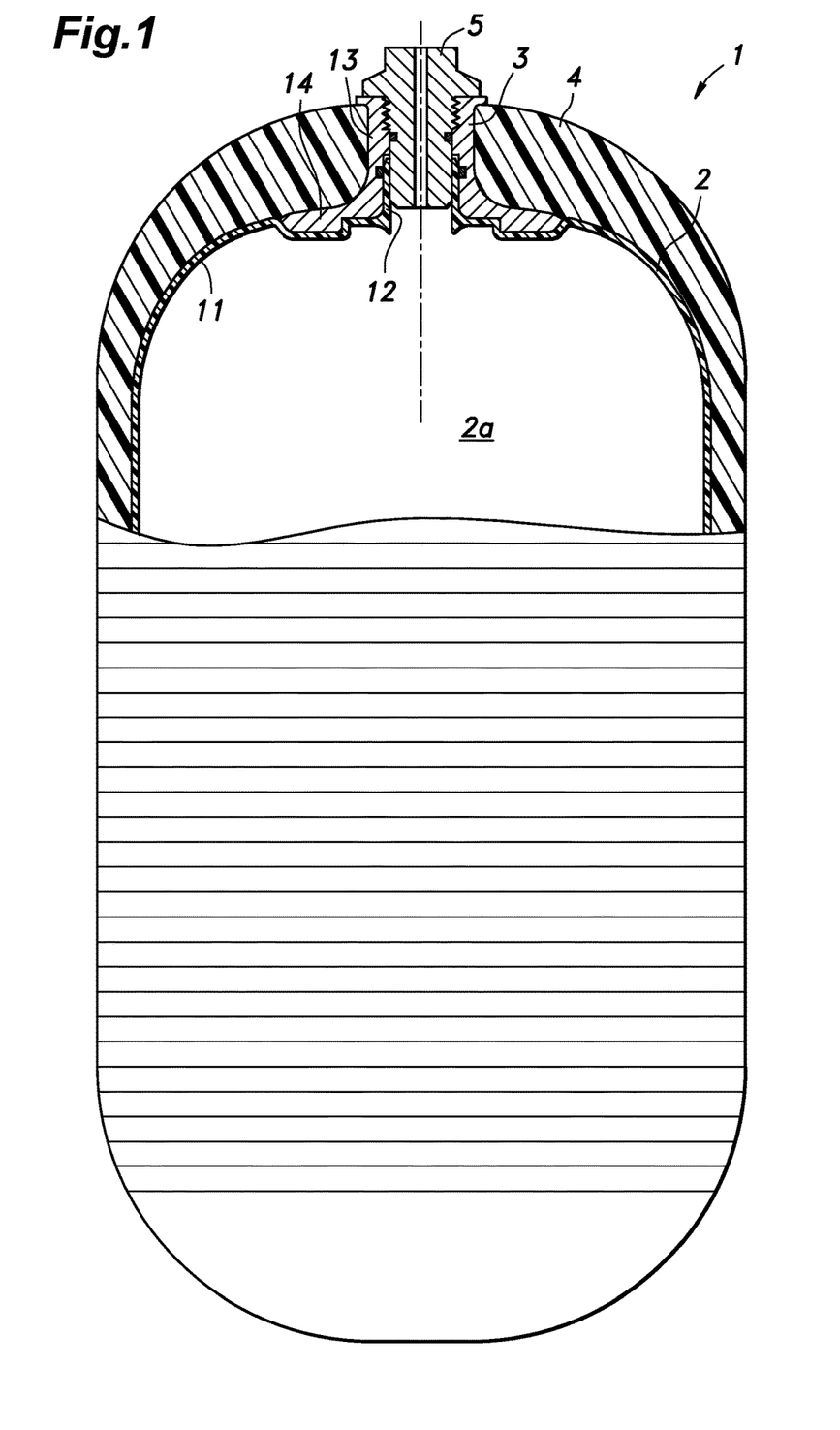
FIG. 1 is a vertical cross-sectional view (partially cut cross-sectional view) showing a pressure vessel according to an embodiment.

FIG. 1 is a vertical cross-sectional view (partially cut cross-sectional view) showing a pressure vessel 1 according to the embodiment. As shown in FIG. 1, the pressure vessel 1 includes a resin liner 2 defining a storage chamber 2a that stores gas or liquid, a metal cap member 3 attached to an outer surface of the resin liner 2, and a reinforcement layer 4 externally stacked on the resin liner 2 and the cap member 3. An attachment is attached to the cap member 3. In the illustrated example, as the attachment, a valve 5 for injecting and discharging high-pressure gas or high-pressure liquid is attached such that the valve 5 is inserted into the cap member 3.

The resin liner 2 includes a main body portion 11 having a hollow cylindrical shape so as to form the storage chamber 2a, and a tubular neck portion 12 formed continuously with the main body portion 11 so as to protrude outward from the main body portion 11. The resin liner 2 has a single-layer structure in the present embodiment. The material of the resin liner 2 is selected according to the gas or liquid to be stored therein and the filling condition (for example, filling pressure) thereof. For example, polyethylene (PE), high density polyethylene (HDPE), polyamide, polyketone, or polyphenylene sulfide (PPS) can be used as the material of the resin liner 2. In the present embodiment, the resin liner 2 is made of high density polyethylene (HDPE).

In another embodiment, the resin liner 2 may have a multi-layer structure. For example, the resin liner 2 may have a laminated structure of three or more layers including a gas barrier layer and two resin layers sandwiching the gas barrier layer. Ethylene vinyl alcohol copolymer resin (EVOH resin) is suitable for the material of the gas barrier layer. Also, high density polyethylene (HDPE) into which fine plate-shaped polyamide sheets are mixed may be used as the material of the gas barrier layer.

The cap member 3 has a cylindrical cap tubular portion 13 externally fitted to the neck portion 12 of the resin liner 2, and an annular flange portion 14 protruding radially outward from a base end of the cap tubular portion 13 on a side of the resin liner 2. The cap tubular portion 13 and the flange portion 14 are formed integrally and continuously with each other. In a state where the cap tubular portion 13 is externally fitted to the neck portion 12, the flange portion 14 is arranged along an outer surface of the main body portion 11 of the resin liner 2 around the neck portion 12.

The reinforcement layer 4 consists of, for example, fiber reinforced plastic (FRP) so as to reinforce the compressive strength of the resin liner 2. The reinforcement layer 4 is provided so as to cover outer surfaces of the main body portion 11 of the resin liner 2 and the flange portion 14 of the cap member 3 by using, for example, a filament winding method to wind a fiber bundle impregnated with a resin and then cure the resin. The method of stacking the reinforcement layer 4 is not limited to this, and other methods such as a sheet winding method to wind a resin sheet in which fibers are embedded may be used.

When the reinforcement layer 4 is formed, the cap member 3 functions as one of a pair of chucking portions to support the resin liner 2. An engagement portion (for example, a screw portion; not shown) for attaching a boss that functions as the other of the pair of chucking portions is formed at the other end of the resin liner 2 on a side opposite to the cap member 3. Alternatively, a member (not shown) having a similar configuration to the cap member 3 may be attached to the other end of the resin liner 2.

Figure 2:
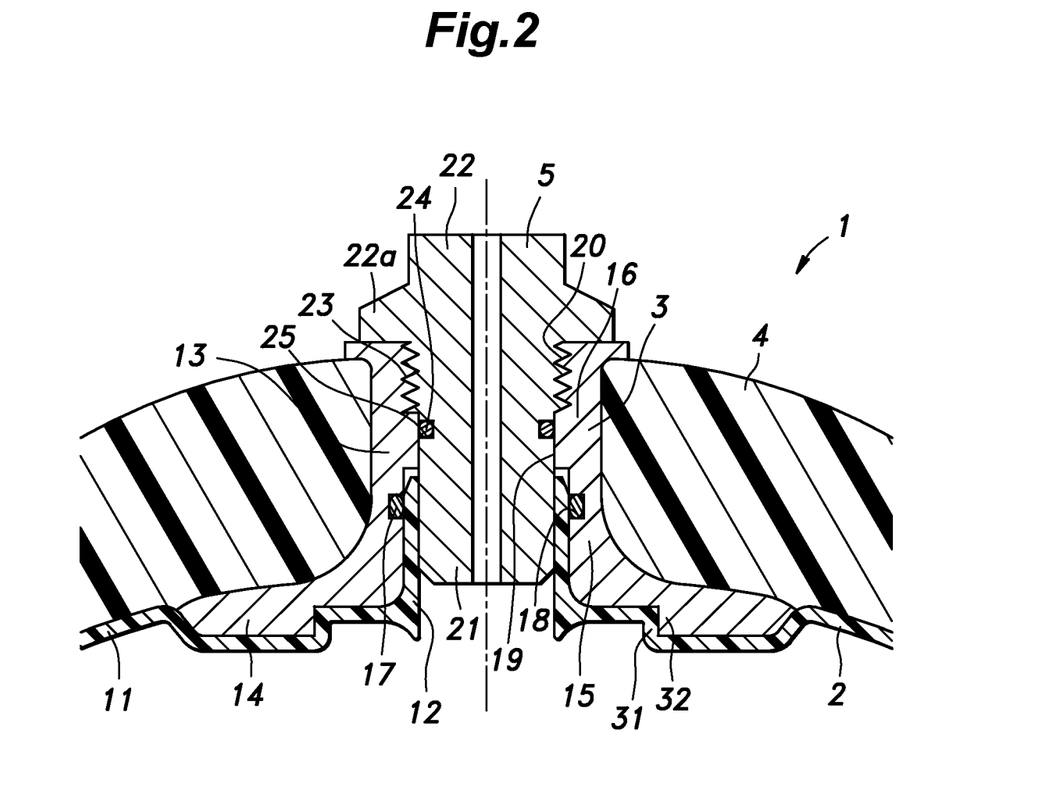
FIG. 2 is an enlarged view of a main portion of FIG. 1.

FIG. 2 is an enlarged view of a main portion of FIG. 1. As shown in FIG. 2, the cap tubular portion 13 includes a cap large diameter portion 15 and a cap small diameter portion 16. The cap large diameter portion 15 is arranged on a side of the flange portion 14, and has an inner diameter substantially the same as an outer diameter of the neck portion 12. The cap small diameter portion 16 is arranged on a tip end side of the cap tubular portion 13, and has an inner diameter substantially the same as an inner diameter of the neck portion 12. An annular first sealing groove 18 that receives a first sealing member 17 interposed between the resin liner 2 and the cap member 3 is formed in a portion of the cap large diameter portion 15 on a side of the cap small diameter portion 16. A cap sealing surface 19 that consists of an inner circumferential surface (an annular smooth surface) is formed in the cap small diameter portion 16 on a side of the cap large diameter portion 15. A cap coupled portion 20 to which the valve 5 is coupled is formed on a tip end side of the cap small diameter portion 16. The first sealing member 17 may consist of, for example, an O ring. The cap coupled portion 20 consists of a female screw in the illustrated example, but is not limited to this embodiment.

The valve 5 includes a valve inserted portion 21 inserted into the cap tubular portion 13, and a valve exposed portion 22 arranged outside the cap tubular portion 13 and exposed to an outside. A valve coupled portion 23 coupled to the cap coupled portion 20 of the cap member 3 is formed in the valve inserted portion 21 on a side of the valve exposed portion 22. In the present embodiment, the valve coupled portion 23 consists of a male screw. A tool engagement portion 22a (for example, a hexagonal portion) for coupling (fastening) the valve coupled portion 23 to the cap coupled portion 20 is provided integrally with the valve exposed portion 22. A portion of the valve inserted portion 21 on a tip end side of the valve coupled portion 23 has an outer diameter substantially the same as an inner diameter of the neck portion 12 and an inner diameter of the cap small diameter portion 16. In a state where the valve 5 is attached, the valve inserted portion 21 has a length to reach the cap large diameter portion 15 and enters an inside of the neck portion 12. An annular second sealing groove 25 that receives a second sealing member 24 interposed between the valve 5 and the cap member 3 is formed on an outer circumferential surface of a portion of the valve inserted portion 21 corresponding to the cap sealing surface 19. The second sealing member 24 may consist of, for example, an O ring.

Figure 3:
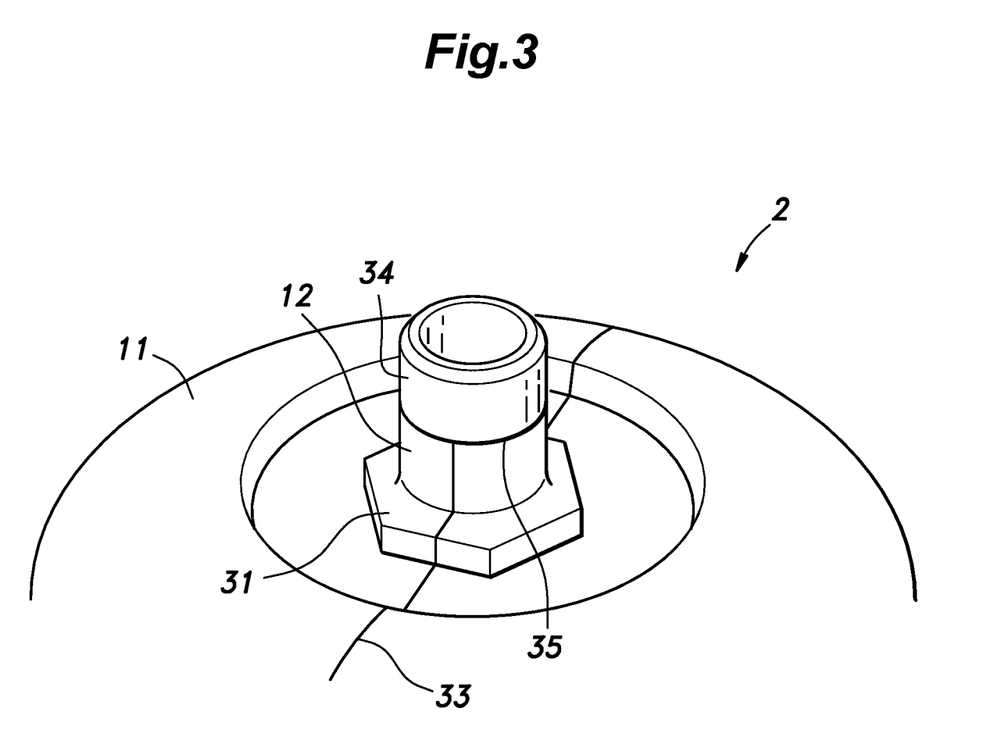
FIG. 3 is a perspective view of a main portion of a resin liner shown in FIG. 1.

FIG. 3 is a perspective view of a main portion of the resin liner 2 shown in FIG. 1. As shown in FIGS. 2 and 3, a coupled structure 31 coupled to the cap member 3 so as to prevent the rotation of the cap member 3 around an axis thereof is formed on a base end side of the neck portion 12 of the resin liner 2. The coupled structure 31 has a polygonal shape (a hexagonal shape in the illustrated example) in the present embodiment, and is a large diameter portion whose diameter is larger than a tip end side of the neck portion 12. A corresponding coupled structure 32 (FIG. 2) coupled to the coupled structure 31 is formed inside the cap member 3. The corresponding coupled structure 32 has a polygonal shape (hexagonal shape) in the present embodiment, and consists of a recessed portion formed on a bottom surface of the cap member 3.

Figure 4:
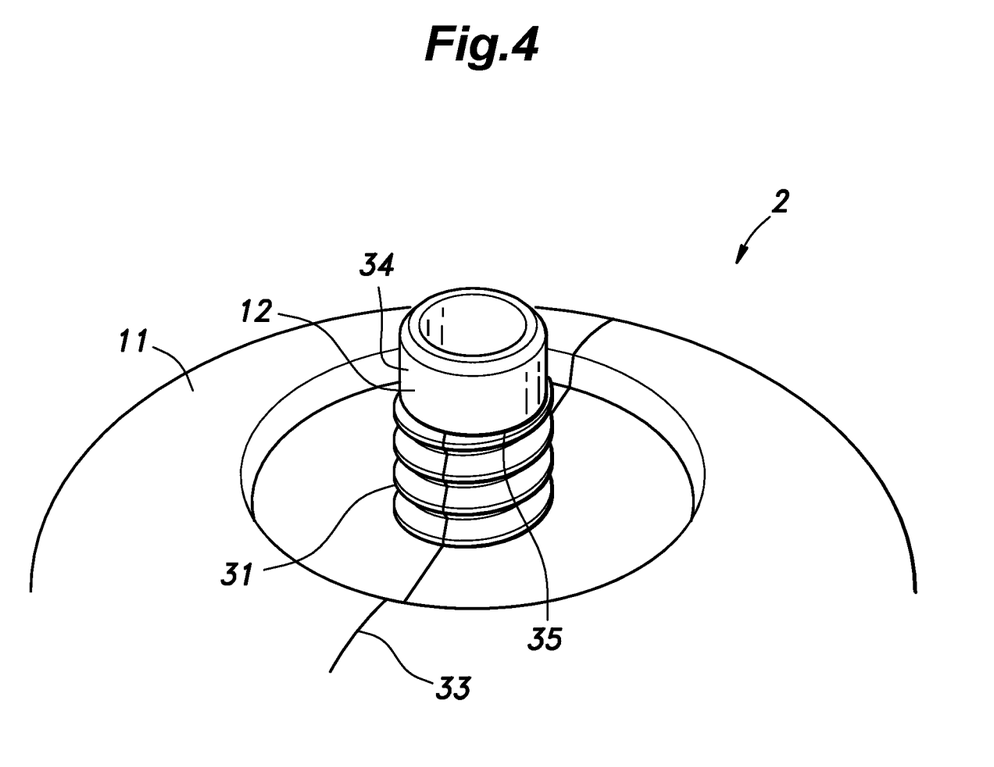
FIG. 4 is a perspective view of a main portion of a resin liner according to another embodiment.

In another embodiment, as shown in FIG. 4, the coupled structure 31 may consist of a male screw formed on a base end side of the neck portion 12. An outer diameter of the male screw is set larger than an outer diameter of the tip end side of the neck portion 12. In this case, the corresponding coupled structure 32 provided in the cap member 3 may consist of a female screw engaging with the male screw. Accordingly, it is possible to prevent not only the rotation of the cap member 3 around the axis thereof with respect to the neck portion 12 of the resin liner 2 but also the movement of the cap member 3 in an axial direction thereof with respect to the neck portion 12 of the resin liner 2.

The resin liner 2 is formed by blow molding. As shown in FIGS. 3 and 4, a parting line 33, which appears at a dividing position of a pair of molds 52 (see FIG. 5), is formed on an outer surface of the resin liner 2. The parting line 33 is a linear protrusion protruding from the outer surface of the resin liner 2. The parting line 33 is formed on an entire circumference of the outer surface of the main body portion 11 of the resin liner 2 and an outer surface of the base portion of the neck portion 12 including the coupled structure 31. The parting line 33 is not formed on an inner surface of the resin liner 2 and an outer surface of a tip portion 34 of the neck portion 12.

An annular burr 35 is generated between the tip portion 34 of the neck portion 12 on which the parting line 33 is not formed and the base portion of the neck portion 12 on which the parting line 33 is formed. The burr 35 is removed after the blow molding. The method of removing the burr 35 is not limited. For example, a cutting process, a grinding process, a laser process, or the like can be used therefor. By contrast, the shape of the blow pin 53 (see FIG. 6; the detailed structure thereof will be described later) that functions as another mold is transferred to the outer surface of the tip portion 34 of the neck portion 12 on which the parting line 33 does not appear. Accordingly, the outer surface of the tip portion 34 of the neck portion 12 is formed smoothly in the blow molding, and the secondary process after the blow molding is not performed.

As shown in FIG. 2, the first sealing member 17 is in contact with an outer circumferential surface of the tip portion 34 of the neck portion 12 on which the parting line 33 does not appear. If the parting line 33 appears on a surface of the neck portion 12 with which the first sealing member 17 is in contact, the sealing property may be degraded and the first sealing member 17 may be deteriorated due to the parting line 33. By contrast, in the present embodiment, the parting line 33 does not appear on the surface of the neck portion 12 with which the first sealing member 17 is in contact. Accordingly, it is possible to prevent the degradation of the sealing property and the deterioration of the first sealing member 17. Further, as the first sealing member 17 is arranged outside the neck portion 12, the first sealing member 17 fulfills the self-sealing function. Accordingly, it is possible to improve the sealing property between the resin liner 2 and the cap member 3.

Next, an outline of a manufacturing method of the resin liner 2 configured in this way will be described with reference to FIGS. 5A to 5D. The resin liner 2 is manufactured by using the blow molding device 50 shown in FIGS. 5A to 5D. Prior to the description of the manufacturing method, an outline of the configuration of the blow molding device 50 will be described.

Figure 5A:
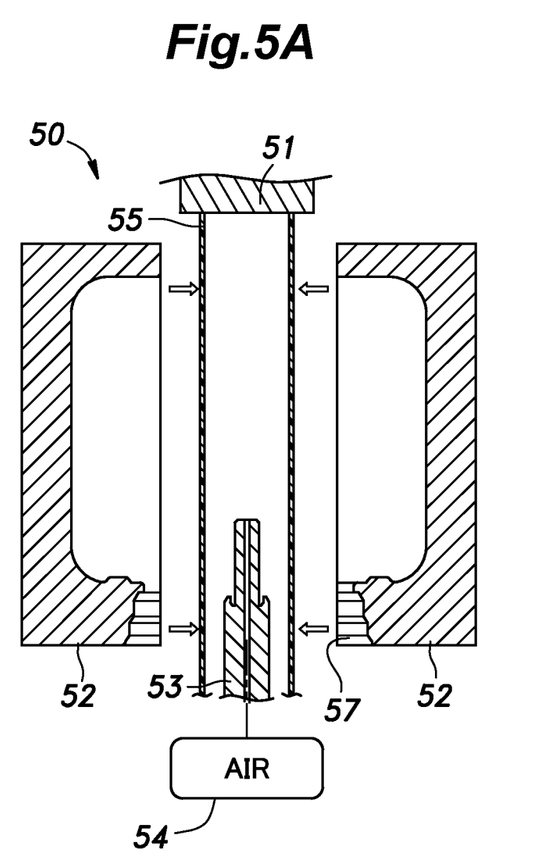
FIGS. 5A to 5D are explanatory diagrams showing an outline of a manufacturing method of the resin liner according to the embodiment.

As shown in FIG. 5A, the blow molding device 50 includes a die device 51, a pair of molds 52 arranged below the die device 51, a blow pin 53, and an air supply source 54. The die device 51 is supplied with a resin, which is heated and melted by an extruder, as a material of the resin liner 2. The die device 51 shapes the resin supplied from the extruder by using a die and a core, and thus supplies the resin downward. The resin extruded downward from the die device 51 is a tubular parison 55 from which the resin liner 2 is formed.

Figure 5B:
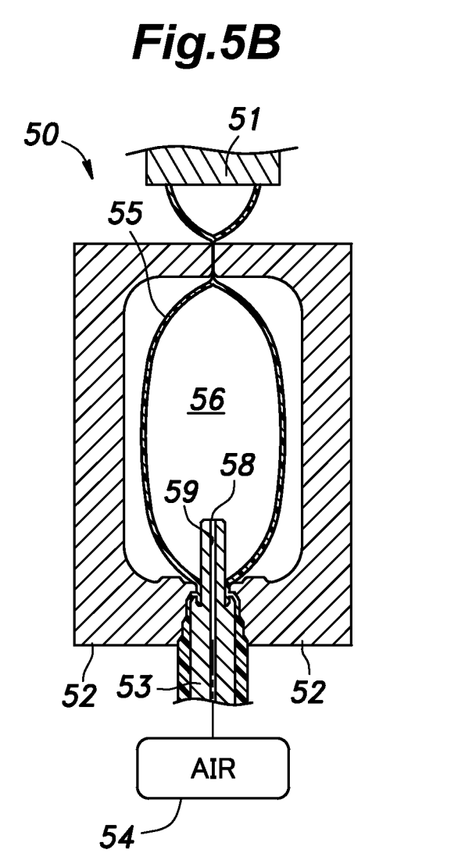

The pair of molds 52 are configured to be openable and closable. In an opened state shown in FIG. 5A in which the pair of molds 52 are laterally separated from each other, the parison 55 is supplied from above between the pair of molds 52. The pair of molds 52 are clamped so as to sandwich, from both lateral sides, the parison 55 from which the resin liner 2 is formed. Accordingly, a closed state shown in FIG. 5B is generated. In the closed state, the pair of molds 52 define a cavity 56 having a shape corresponding to a contour of the main body portion 11 of the resin liner 2. Further, the pair of molds 52 define a blow pin insertion hole 57 extending from an outside to the cavity 56. In the present embodiment, the blow pin insertion hole 57 is formed at lower ends of the pair of molds 52. In another embodiment, the blow pin insertion hole 57 may be formed at upper ends of the pair of molds 52 or at both the upper and lower ends of the pair of molds 52.

The blow pin 53 is arranged at a position corresponding to the lower ends of the pair of molds 52 such that the axial direction of the blow pin 53 matches the up-and-down direction. The blow pin 53 is movable in the axial direction thereof. That is, the blow pin 53 is movable in the axial direction thereof with respect to the pair of molds 52. In another embodiment, the pair of molds 52 may be movable in the axial direction of the blow pin 53. In the closed state of the molds 52 shown in FIG. 5B, the blow pin 53 penetrates the blow pin insertion hole 57, and is arranged at a height that an upper portion of the blow pin 53 is located inside the cavity 56. A tip portion of the blow pin 53 is provided with at least one air supply opening 58 located inside the parison 55 in the closed state of the molds 52. An air supply passage 59 that leads to the air supply opening 58 is formed inside the blow pin 53. The blow pin 53 supplies air, which is supplied from the air supply source 54, from the air supply opening 58 to an inside of the parison 55.

Figure 5C:
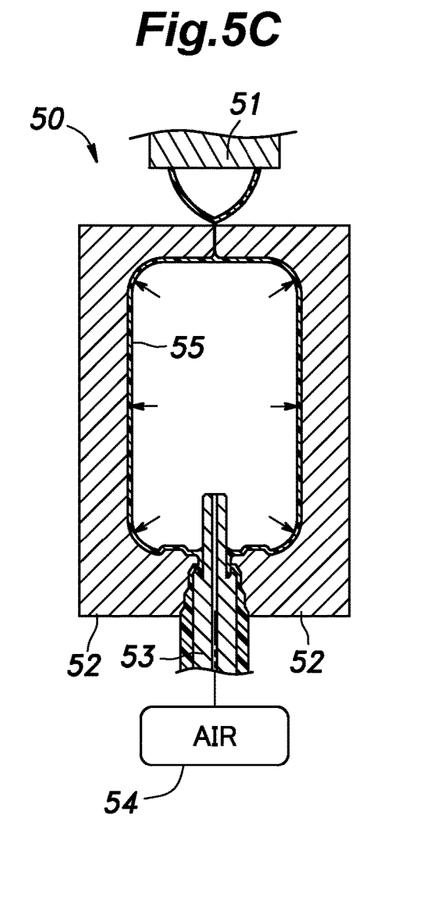
Figure 5D:
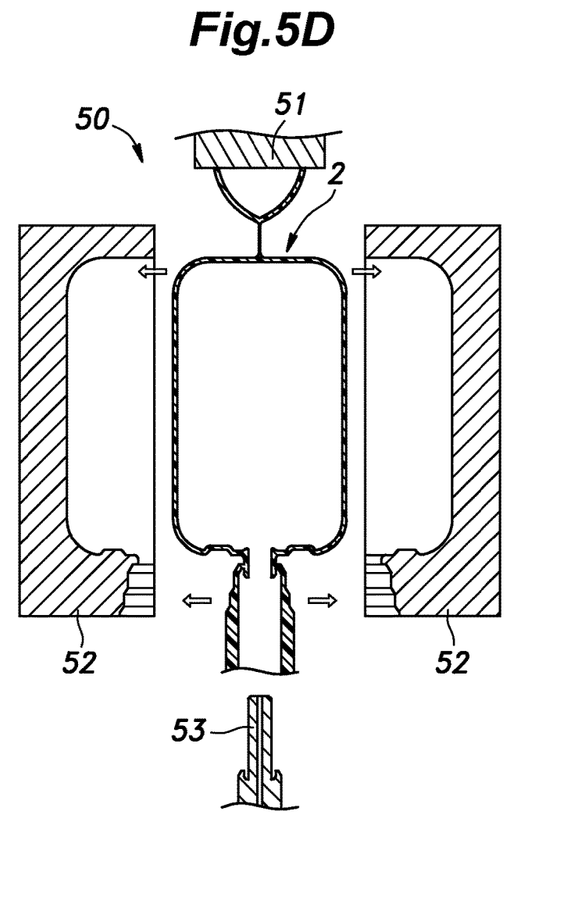

The manufacturing process of the resin liner 2 by using the blow molding device 50 configured in this way includes a parison arranging process shown in FIG. 5A, a mold clamping process shown in FIG. 5B, a blow process shown in FIG. 5C, and a mold opening process shown in FIG. 5D. In the parison arranging process, as shown in FIG. 5A, the die device 51 forms the tubular parison 55 from which the resin liner 2 is formed, and the parison 55 is arranged on an outer circumferential side of the blow pin 53 and between the pair of molds 52 that are laterally separated from each other. In the mold clamping process, as shown in FIG. 5B, the pair of molds 52 are clamped so as to sandwich the parison 55. In the blow process, as shown in FIG. 5C, the air is supplied from the air supply opening 58 of the blow pin 53 to the inside of the parison 55, and thus the parison 55 expands. Accordingly, the shape of an inner surface of the cavity 56 is transferred to a portion of the parison 55 from which the main body portion 11 of the resin liner 2 is formed.

In the mold opening process, as shown in FIG. 5D, the pair of molds 52 are opened so as to be laterally separated from each other, and are removed from the parison 55 having a shape of the resin liner 2. Further, the blow pin 53 is removed from the parison 55 having the shape of the resin liner 2. Either the opening of the pair of molds 52 or the removal of the blow pin 53 may be performed first. The burr 35 is removed by using a cutter.

After the manufacturing process of the resin liner 2 is completed, the cap member 3 is attached to an outer circumference of the neck portion 12 in a state where the first sealing member 17 is interposed therebetween as shown in FIGS. 1 and 2. After that, the outer circumferences of the resin liner 2 and the cap member 3 are covered with the reinforcement layer 4, and thus the pressure vessel 1 is manufactured. Further, as needed, the attachment such as the valve 5 is attached to the cap member 3.

Figure 6:
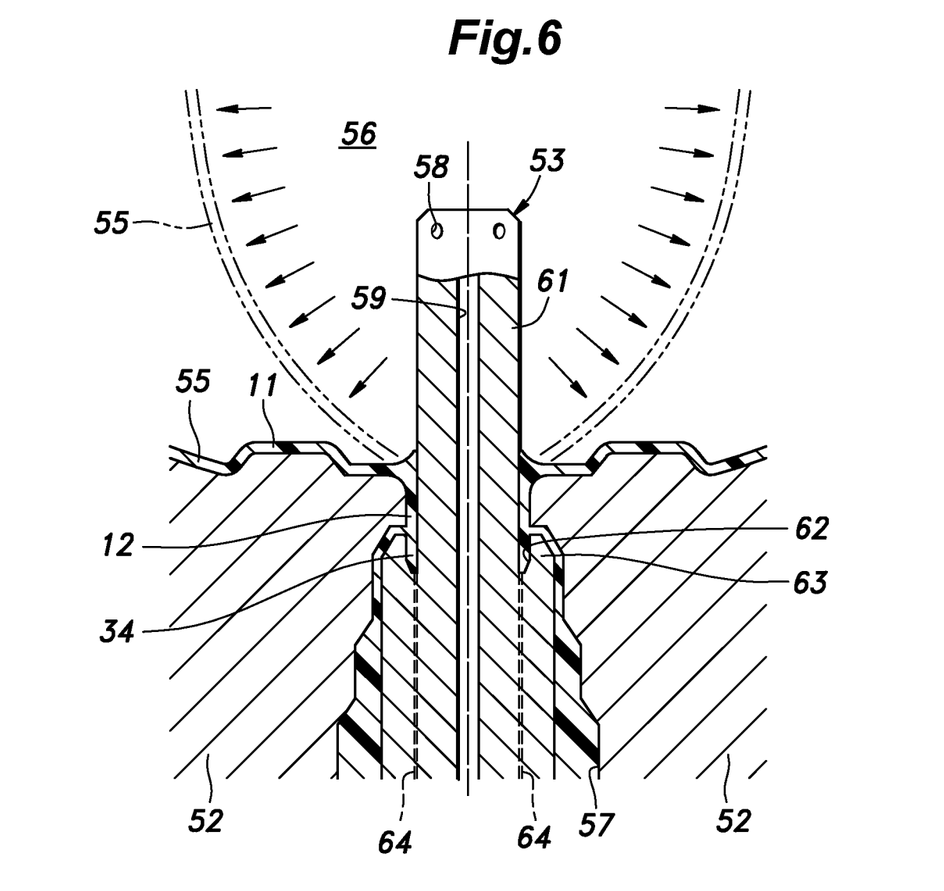
FIG. 6 is a cross-sectional view of a main portion of a blow molding device shown in FIGS. 5A to 5D.

Next, the detailed structure of the blow pin 53 and the details of the manufacturing method of the resin liner 2 will be described with reference to FIG. 6. FIG. 6 is a cross-sectional view of a main portion of the blow molding device 50 shown in FIGS. 5A to 5D. The blow pin 53 includes a blow pin body portion 61 provided with the air supply passage 59 that leads to the air supply opening 58 and having an outer circumferential surface of a shape corresponding to an inner circumferential surface of the neck portion 12 of the resin liner 2. Further, the blow pin 53 includes a ring portion 63 provided coaxially with the blow pin body portion 61 and forming an annular recess portion 62 between the blow pin body portion 61 and the ring portion 63 so as to form the outer circumferential surface of the tip portion 34 of the neck portion 12. The annular recess portion 62 is recessed away from the cavity 56.

The ring portion 63 is provided integrally with the blow pin body portion 61, and is provided fixedly to the blow pin body portion 61. The blow pin 53 is provided with an air release passage 64 extending from the bottom of the annular recess portion 62. The air release passage 64 may be provided in either the ring portion 63 or the blow pin body portion 61.

As the blow pin 53 is configured in this way, the parison 55 enters the annular recess portion 62 between the mold clamping process of FIG. 5B and the blow process of FIG. 5C, more specifically, during the mold clamping process. The shape of an inner circumferential surface of the ring portion 63 is transferred to a portion of the parison 55 from which the tip portion 34 of the neck portion 12 is formed. Accordingly, as shown in FIGS. 3 and 4, the outer circumferential surface of the tip portion 34 of the neck portion 12 is formed into a smooth surface without the parting line 33. Accordingly, it is possible to prevent the degradation of the sealing property of the first sealing member 17 and the deterioration of the first sealing member 17, which is interposed between the neck portion 12 and the cap member 3.

Figure 7A:
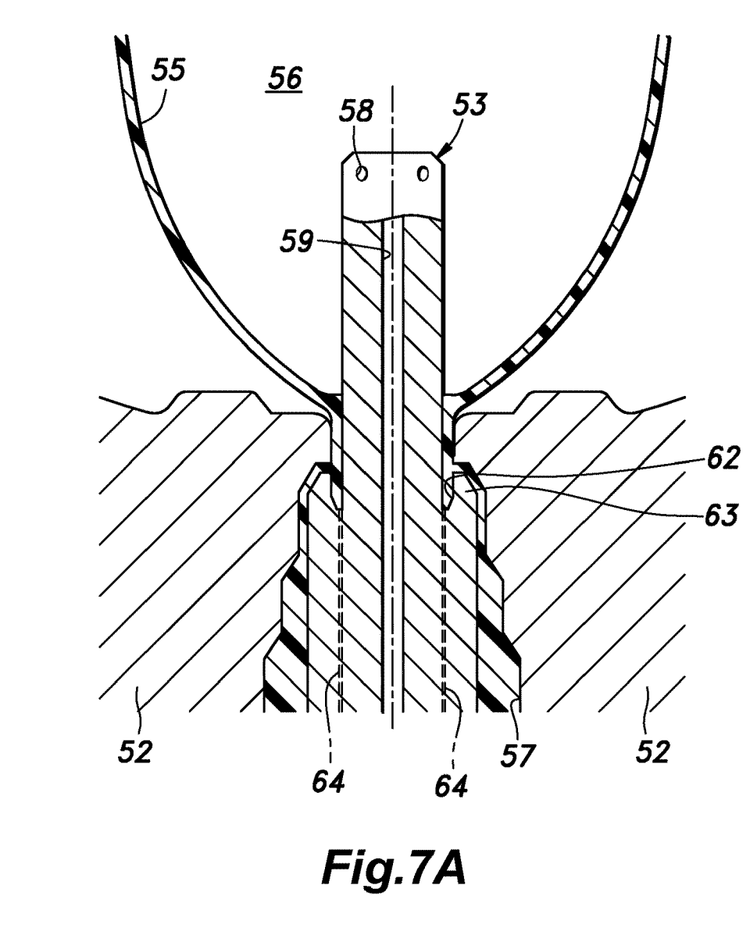
FIGS. 7A and 7B are explanatory diagrams showing a molding method of a neck portion by using the blow molding device shown in FIG. 6.

FIGS. 7A and 7B are explanatory diagrams showing a molding method of the neck portion 12 by using the blow molding device 50 shown in FIG. 6. In the parison arranging process, the blow pin 53 is arranged in a prescribed position for the blow molding. As shown in FIG. 7A, as the pair of molds 52 are clamped, the parison 55 enters the annular recess portion 62 and spreads over the bottom of the annular recess portion 62. Accordingly, the shape of the inner circumferential surface of the ring portion 63 is transferred to the parison 55. At this time, as the air release passage 64 extending from the bottom of the annular recess portion 62 is formed in the blow pin 53, the parison 55 is more likely to spread over the bottom of the annular recess portion 62. Alternatively, as a negative pressure is applied to the air release passage 64, the parison 55 is more likely to spread over the bottom of the annular recess portion 62.

Figure 7B:
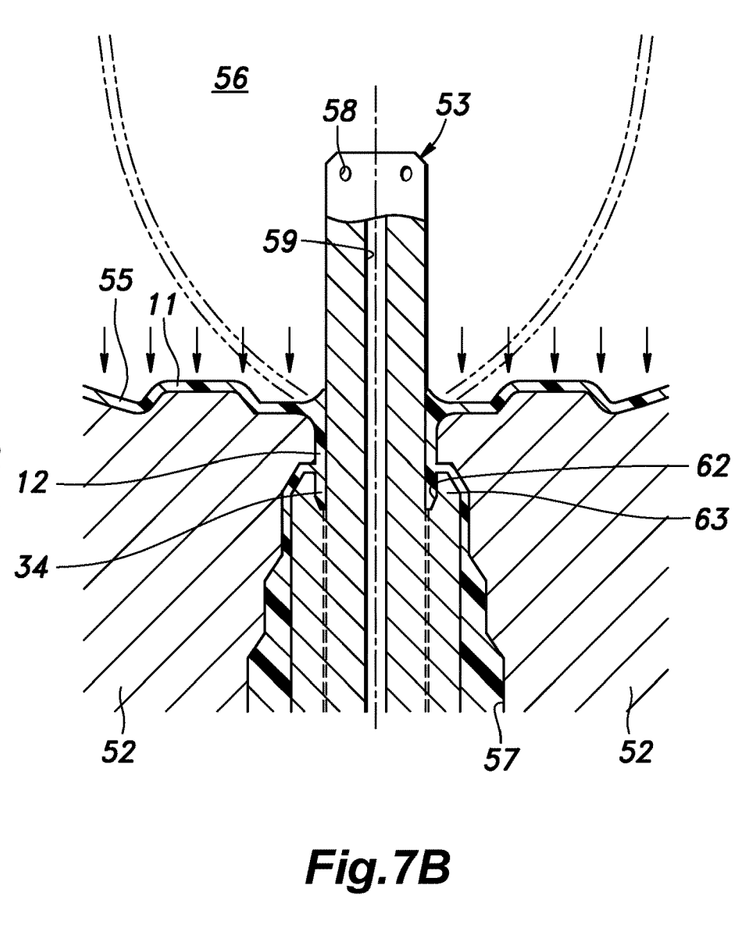

After that, as shown in FIG. 7B, in the blow process, the air is supplied from the air supply opening 58 of the blow pin 53 to the inside of the parison 55. Accordingly, the parison 55 expands and comes into close contact with the inner surface of the cavity 56, and thus the shapes of the pair of molds 52 (the shape of the inner surface of the cavity 56) are transferred to the parison 55.

Figure 8A:
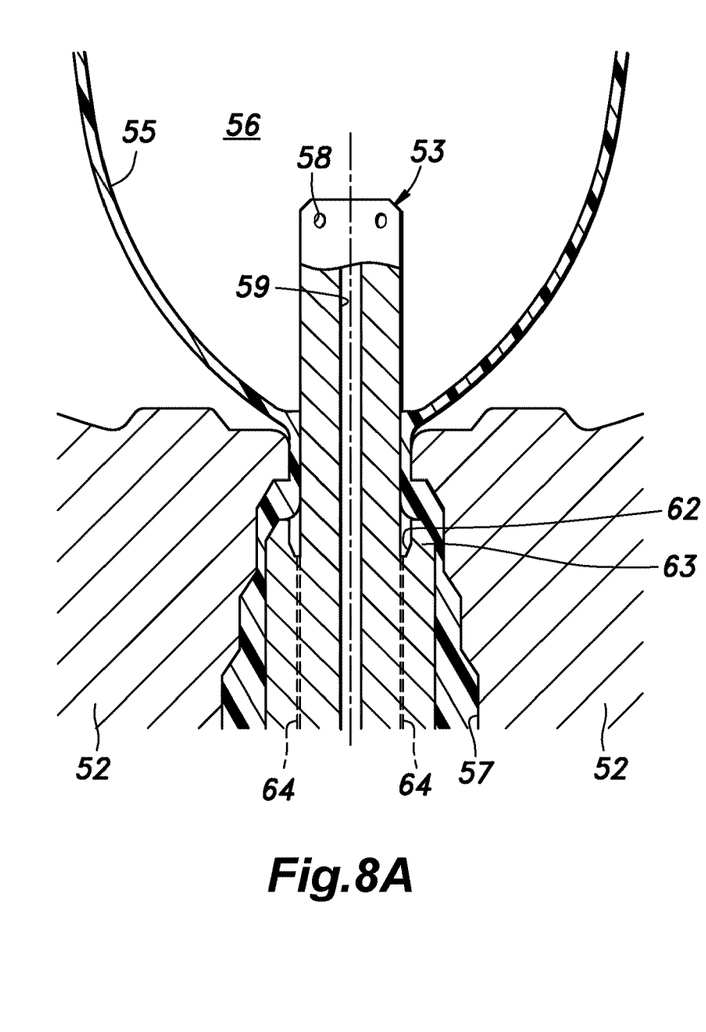
FIGS. 8A and 8B are explanatory diagrams showing a molding method according to a modified embodiment of the neck portion by using the blow molding device shown in FIG. 6.
Figure 8B:
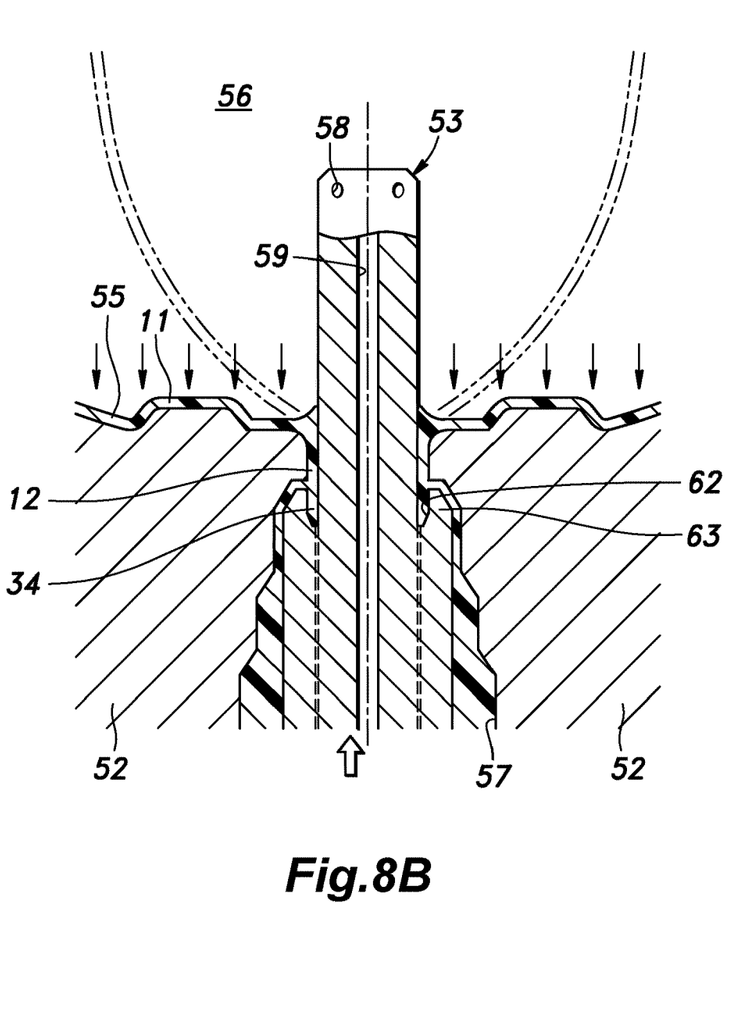

FIGS. 8A and 8B are explanatory diagrams showing a molding method according to a modified embodiment of the neck portion 12 by using the blow molding device 50 shown in FIG. 6. As shown in FIGS. 8A and 8B, this modified embodiment differs from the above embodiment in that the blow pin 53 is moved in the axial direction thereof between the mold clamping process and the blow process. More specifically, in the parison arranging process, as shown in FIG. 8A, the blow pin 53 is arranged slightly below the prescribed position for the blow molding. Then, between the mold clamping process and the blow process, as shown in FIG. 8B, the annular recess portion 62 moves toward the cavity 56 (moves upward) along the axial direction of the blow pin 53. As described above, the ring portion 63 is fixed to the blow pin body portion 61. Accordingly, in the present embodiment, the annular recess portion 62 moves as the blow pin 53 moves upward along the axial direction thereof.

Accordingly, the parison 55 spreads over the bottom of the annular recess portion 62, even if the parison 55 does not reach the bottom of the annular recess portion 62 in the mold clamping process as shown in FIG. 8A. Further, the blow pin 53 is movable in the axial direction thereof with respect to the pair of molds 52, and the manufacturing method of the resin liner 2 includes a process of moving the blow pin 53 in the axial direction thereof. Accordingly, it is possible to increase the axial length of the tip portion 34 of the neck portion 12 on which the parting line 33 does not appear.

Figure 9:
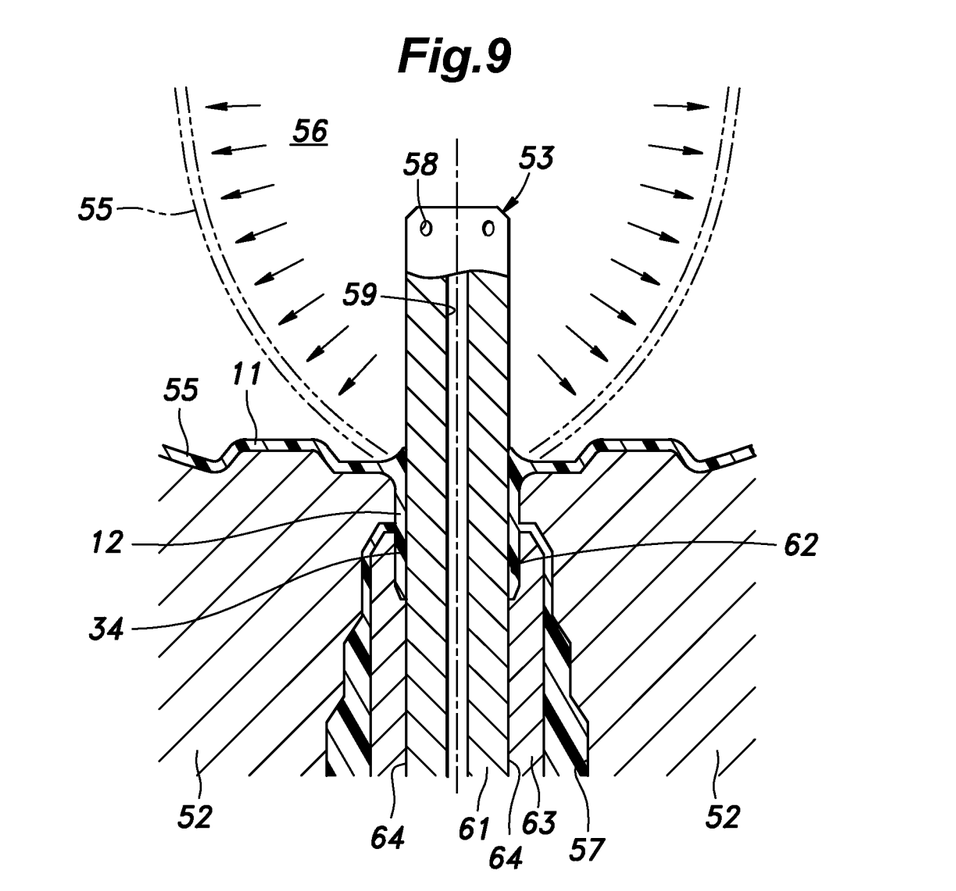
FIG. 9 is a cross-sectional view of a main portion of another embodiment of the blow molding device shown in FIGS. 5A to 5D.

FIG. 9 is a cross-sectional view of a main portion of another embodiment of the blow molding device 50 shown in FIGS. 5A to 5D. Elements that are the same as or similar to those of the above embodiment are provided with common reference numerals, and duplicate explanations will be omitted. In this embodiment, the ring portion 63 is formed separately from the blow pin body portion 61, and is slidable in the axial direction thereof with respect to the blow pin body portion 61. The air release passage 64 is formed between the ring portion 63 and the blow pin body portion 61.

Figure 10A:
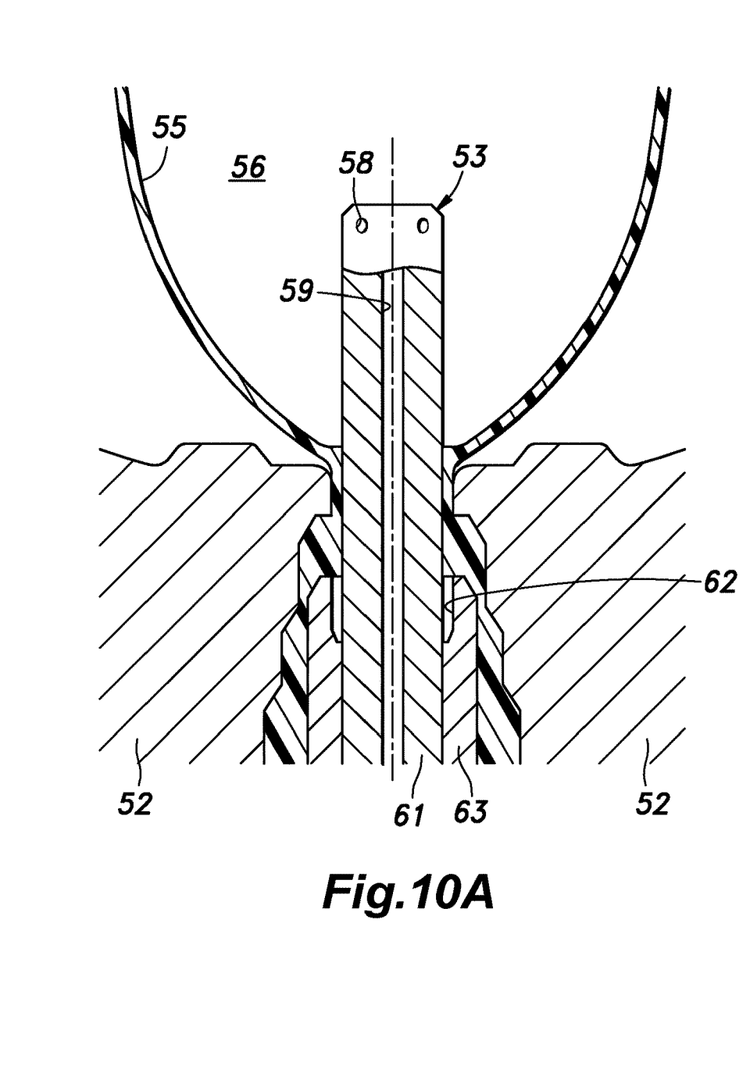
FIGS. 10A and 10B are explanatory diagrams of a molding method of a neck portion by using the blow molding device shown in FIG. 9.
Figure 10B:
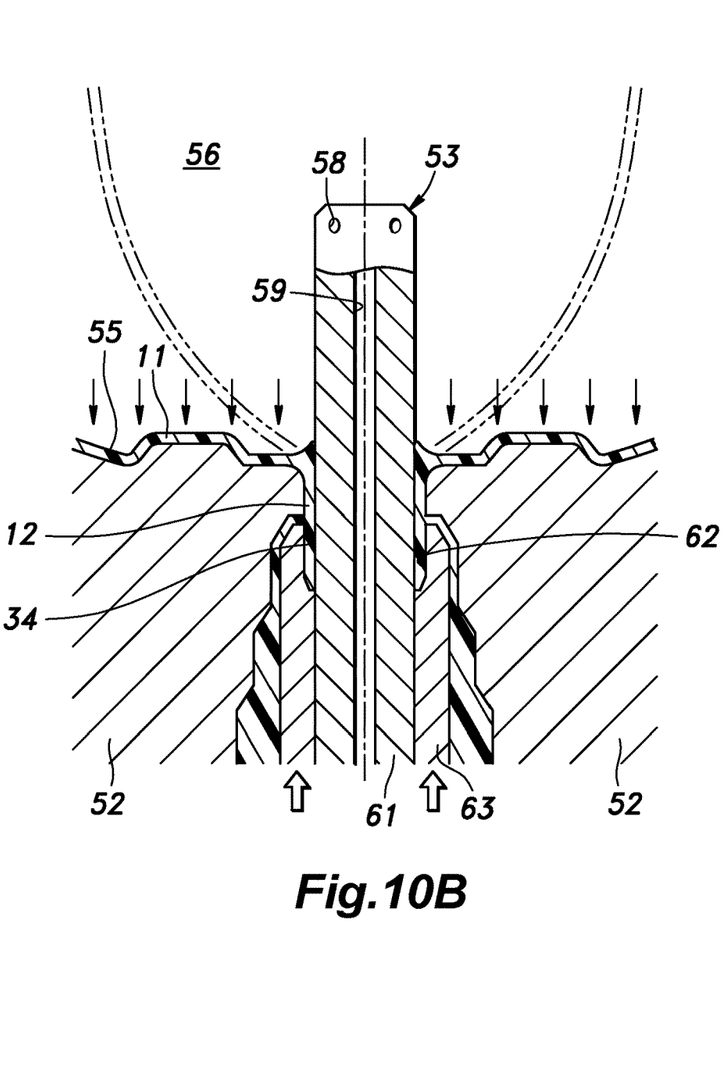

When the resin liner 2 is manufactured by the blow molding in which the blow pin 53 of this embodiment is used, it is preferable that the resin liner 2 is manufactured as shown in FIGS. 10A and 10B, while the resin liner 2 can be manufactured as shown in FIGS. 7A, 7B, 8A, and 8B. FIGS. 10A and 10B are explanatory diagrams of the molding method of the neck portion 12 by using the blow molding device 50 shown in FIG. 9. In the parison arranging process, as shown in FIG. 10A, the ring portion 63 is arranged slightly lower than the blow pin body portion 61. Then, as shown in FIG. 10B, the ring portion 63 slides toward the cavity 56 (slides upward) with respect to the blow pin body portion 61 between the mold clamping process and the blow process. Accordingly, the annular recess portion 62 moves toward the cavity 56.

Thus, the parison 55 spreads over the bottom of the annular recess portion 62 without moving the blow pin body portion 61 in the axial direction thereof, even if the parison 55 does not reach the bottom of the annular recess portion 62 in the mold clamping process as shown in FIG. 10A. Accordingly, it is possible to increase the axial length of the tip portion 34 of the neck portion 12 on which the parting line 33 does not appear.

Concrete embodiments of the present invention have been described in the foregoing, but the present invention should not be limited by the foregoing embodiments and various modifications and alterations are possible within the scope of the present invention. Also, not all the structural elements shown in the above embodiments are necessarily indispensable and they may be selectively adopted as appropriate.

Glossary of Terms

1: pressure vessel
2: resin liner

3: cap member
11: main body portion
12: neck portion
33: parting line
34: tip portion
35: burr
50: blow molding device
52: mold
53: blow pin
55: parison
56: cavity
58: air supply opening
59: air supply passage
61: blow pin body portion
62: annular recess portion
63: ring portion
64: air release passage

The invention claimed is:

1. A blow molding device for manufacturing a resin liner for a pressure vessel, the resin liner including a tubular neck portion having a tip portion to which a cap member is fitted externally, the blow molding device comprising:
 a pair of molds configured to be clamped so as to sandwich, from both lateral sides, a parison from which the resin liner is formed, the pair of molds defining a cavity having a shape corresponding to a contour of a main body portion of the resin liner; and
 a blow pin configured to form the neck portion together with the molds and having an air supply opening to be arranged inside the parison,
 wherein the blow pin includes:
  a blow pin body portion provided with an air supply passage that leads to the air supply opening and having an outer circumferential surface of a shape corresponding to an inner circumferential surface of the neck portion;
  a ring portion provided coaxially with the blow pin body portion; and
  an annular recess portion defined between the blow pin body portion and the ring portion to form an outer circumferential surface of the tip portion of the neck portion to which the cap member is fitted externally, the annular recess portion being recessed in a recess direction away from the cavity,
 wherein the blow pin defines an air release passage extending from a bottom of the annular recess portion, and
 wherein the ring portion is slidable in an axial direction thereof with respect to the blow pin body portion.

2. The blow molding device according to claim 1, wherein the blow pin is movable in an axial direction thereof with respect to the pair of molds.

3. The blow molding device according to claim 1, wherein the air release passage is configured to be applied with a negative pressure.

4. The blow molding device according to claim 1, wherein the air release passage extends in the recess direction from the bottom of the annular recess portion.

5. The blow molding device according to claim 1, wherein the air release passage defines a linear longitudinal axis that is parallel to a longitudinal axis of the air supply passage.

6. The blow molding device according to claim 1, wherein the air release passage defines a linear longitudinal axis that is collinear with a longitudinal axis of the annular recess portion.

7. A manufacturing method of the resin liner using the blow molding device according to claim 1, the manufacturing method comprising:
 a parison arranging process of arranging the parison on an outer circumferential side of the blow pin and between the pair of molds that are laterally separated from each other;
 a mold clamping process of clamping the pair of molds such that the pair of molds sandwich the parison; and
 a blow process of expanding the parison by supplying air to an inside thereof from the air supply opening of the blow pin and transferring a shape of an inner surface of the cavity to a portion of the parison from which the main body portion of the resin liner is formed,
 wherein between the mold clamping process and the blow process, the parison enters the annular recess portion and a shape of an inner circumferential surface of the ring portion is transferred to a portion of the parison from which the tip portion of the neck portion is formed.

8. The manufacturing method according to claim 7, wherein between the mold clamping process and the blow process, the annular recess portion moves toward the cavity along an axial direction of the blow pin.

9. The manufacturing method according to claim 8, wherein between the mold clamping process and the blow process, the annular recess portion moves as the blow pin moves in the axial direction.

10. The manufacturing method according to claim 8, wherein the ring portion is slidable in an axial direction thereof with respect to the blow pin body portion, and
 between the mold clamping process and the blow process, the annular recess portion moves as the ring portion slides in the axial direction thereof with respect to the blow pin body portion.

* * * * *